United States Patent
Takada et al.

(10) Patent No.: US 11,635,862 B2
(45) Date of Patent: Apr. 25, 2023

(54) ROTATABLE INPUT KNOB CONFIGURED TO OPERATE ON ELECTROSTATIC CAPACITIVE TOUCH PANEL

(71) Applicant: Japan Display Inc., Tokyo (JP)

(72) Inventors: Naoki Takada, Tokyo (JP); Toshihiko Tanaka, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/333,010

(22) Filed: May 28, 2021

(65) Prior Publication Data

US 2021/0286470 A1    Sep. 16, 2021

Related U.S. Application Data

(63) Continuation of application No. PCT/JP2019/038663, filed on Sep. 30, 2019.

(30) Foreign Application Priority Data

Nov. 29, 2018  (JP) .............................. JP2018-223453

(51) Int. Cl.
  *G06F 3/044*    (2006.01)
  *G06F 3/0362*   (2013.01)
(52) U.S. Cl.
  CPC .......... *G06F 3/0445* (2019.05); *G06F 3/0362* (2013.01)
(58) Field of Classification Search
  None
  See application file for complete search history.

(56) References Cited

U.S. PATENT DOCUMENTS

| 2008/0238879 | A1* | 10/2008 | Jaeger | ................... G06F 3/0338 345/173 |
| 2013/0249825 | A1* | 9/2013 | Kang | ................... G06F 3/0412 345/173 |

(Continued)

FOREIGN PATENT DOCUMENTS

| JP | 2015-125687 A | 7/2015 |
| JP | 2016-33838 A | 3/2016 |

(Continued)

OTHER PUBLICATIONS

International Search Report and Written Opinion dated Dec. 17, 2019, received for PCT Application PCT/JP2019/038663, Filed on Sep. 30, 2019, 11 pages including English Translation.

(Continued)

*Primary Examiner* — Amare Mengistu
*Assistant Examiner* — Sarvesh J Nadkarni
(74) *Attorney, Agent, or Firm* — Xsensus LLP

(57) ABSTRACT

According to one embodiment, a sensor device includes an electrostatic capacitive touch panel, a knob disposed rotatably about a rotation axis, a conductor held by the knob and opposed to the touch panel on a part of a circumference about the rotation axis, and a sensor controller which controls the touch panel. The sensor controller holds a reference signal corresponding to an electrostatic capacitance in a state where the conductor is not opposed to the touch panel, and detects first coordinates of the conductor based on a first sensor signal received from the touch panel in a state where the conductor is opposed to a first position of the touch panel and the reference signal in a first sensing period.

19 Claims, 17 Drawing Sheets

(56) References Cited

U.S. PATENT DOCUMENTS

| | | | |
|---|---|---|---|
| 2014/0292682 A1 | 10/2014 | Kida et al. | |
| 2015/0185951 A1 | 7/2015 | Akai et al. | |
| 2017/0052617 A1 | 2/2017 | Okuzumi et al. | |
| 2017/0357375 A1 | 12/2017 | Mori et al. | |
| 2018/0024649 A1* | 1/2018 | Uno | G06F 3/0338 345/174 |
| 2018/0129337 A1* | 5/2018 | Stone | G06F 3/04162 |
| 2018/0373351 A1 | 12/2018 | Sawada et al. | |
| 2020/0004376 A1* | 1/2020 | Knoppert | G06F 3/0418 |
| 2020/0233521 A1* | 7/2020 | Sasaki | G06F 3/0393 |
| 2021/0041977 A1* | 2/2021 | Yarosh | G06F 3/0445 |

FOREIGN PATENT DOCUMENTS

| | | |
|---|---|---|
| JP | 2017-21863 A | 1/2017 |
| JP | 2017-182192 A | 10/2017 |
| JP | 2017-220140 A | 12/2017 |
| JP | 6403921 B1 | 10/2018 |
| WO | 2015/174092 A1 | 11/2015 |
| WO | 2017/094234 A1 | 6/2017 |

OTHER PUBLICATIONS

English translation of Office Action dated Dec. 13, 2022, in corresponding Japanese patent Application No. 2018-223453, 4 pages.

* cited by examiner

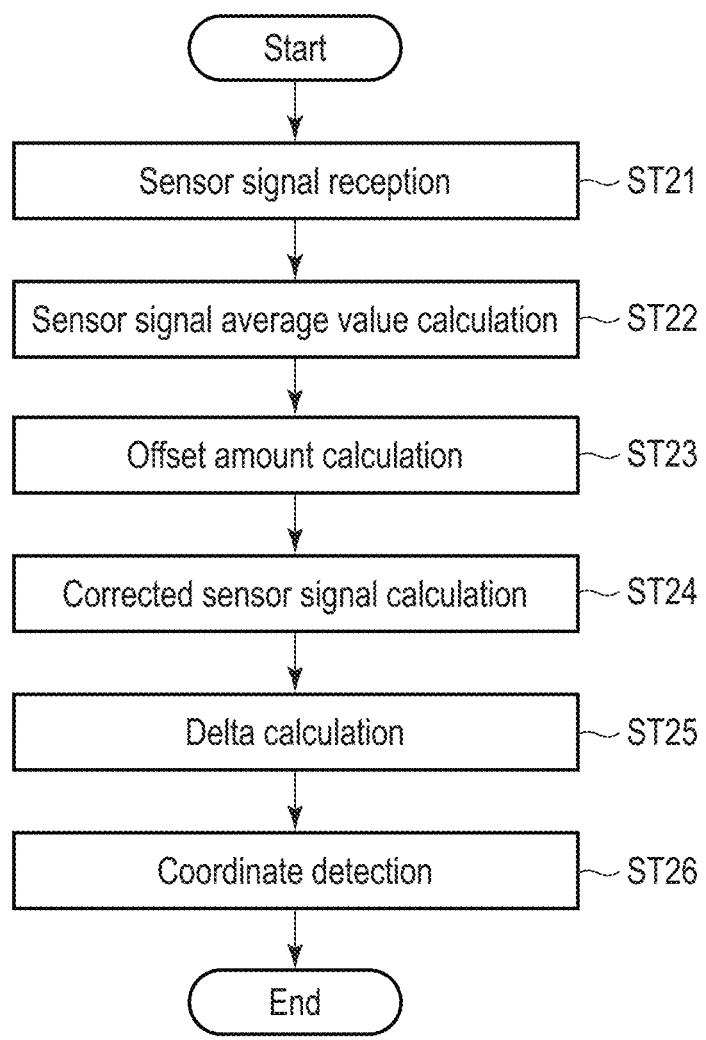
F I G. 10

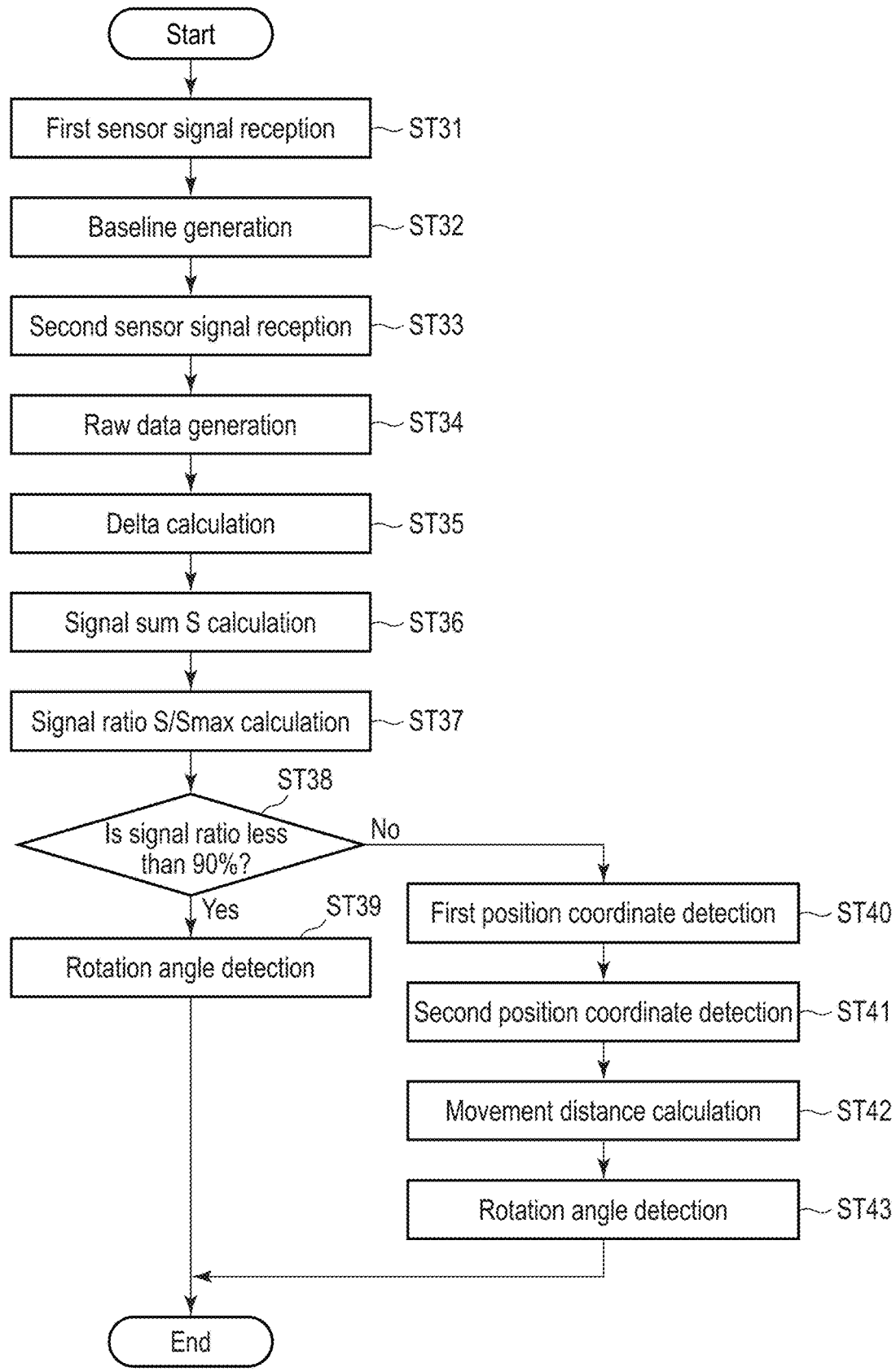
F I G. 14

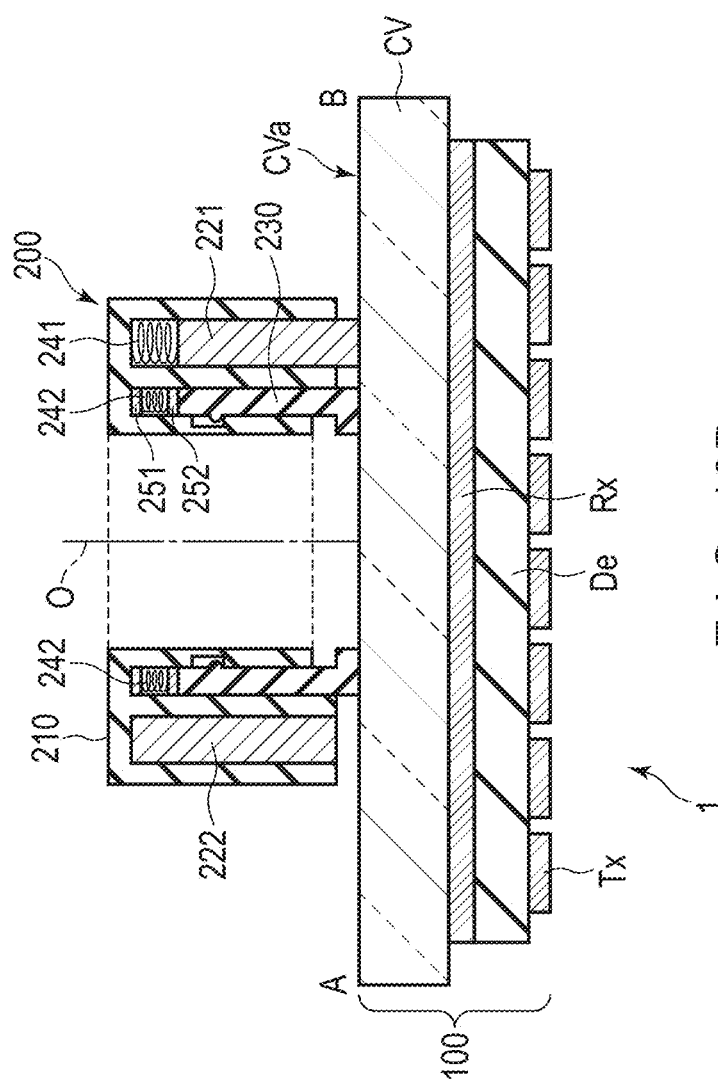
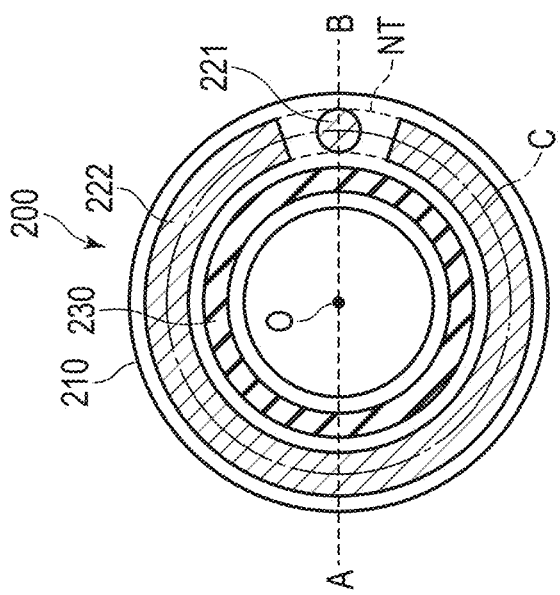
FIG. 19A
FIG. 19B

ROTATABLE INPUT KNOB CONFIGURED TO OPERATE ON ELECTROSTATIC CAPACITIVE TOUCH PANEL

CROSS-REFERENCE TO RELATED APPLICATIONS

This application is a Continuation Application of PCT Application No. PCT/JP2019/038663, filed Sep. 30, 2019 and based upon and claiming the benefit of priority from Japanese Patent Application No. 2018-223453, filed Nov. 29, 2018, the entire contents of all of which are incorporated herein by reference.

FIELD

Embodiments described herein relate generally to a sensor device.

BACKGROUND

Recently, as an interface or the like of a display device, a sensor which detects a contact or approach of an object such as a finger has been put into practical use. As an example, an input device attachable to and detachable from a display device is disclosed. This input device mechanically, optically or magnetically detects a rotation operation of an operation input part which rotationally moves with respect to a stationary part. A detection signal is transmitted to the display device by wireless communication.

BRIEF DESCRIPTION OF THE DRAWINGS

FIG. 10 is a flowchart for explaining another process of detecting the coordinates of the conductor 220.

FIG. 14 is a flowchart for explaining another process of detecting the rotation angle of the conductor 220.

FIG. 19A is an illustration showing the third configuration example of the input device 200.

FIG. 19B is an illustration showing the third configuration example of the input device 200.

DETAILED DESCRIPTION

Figure 1:
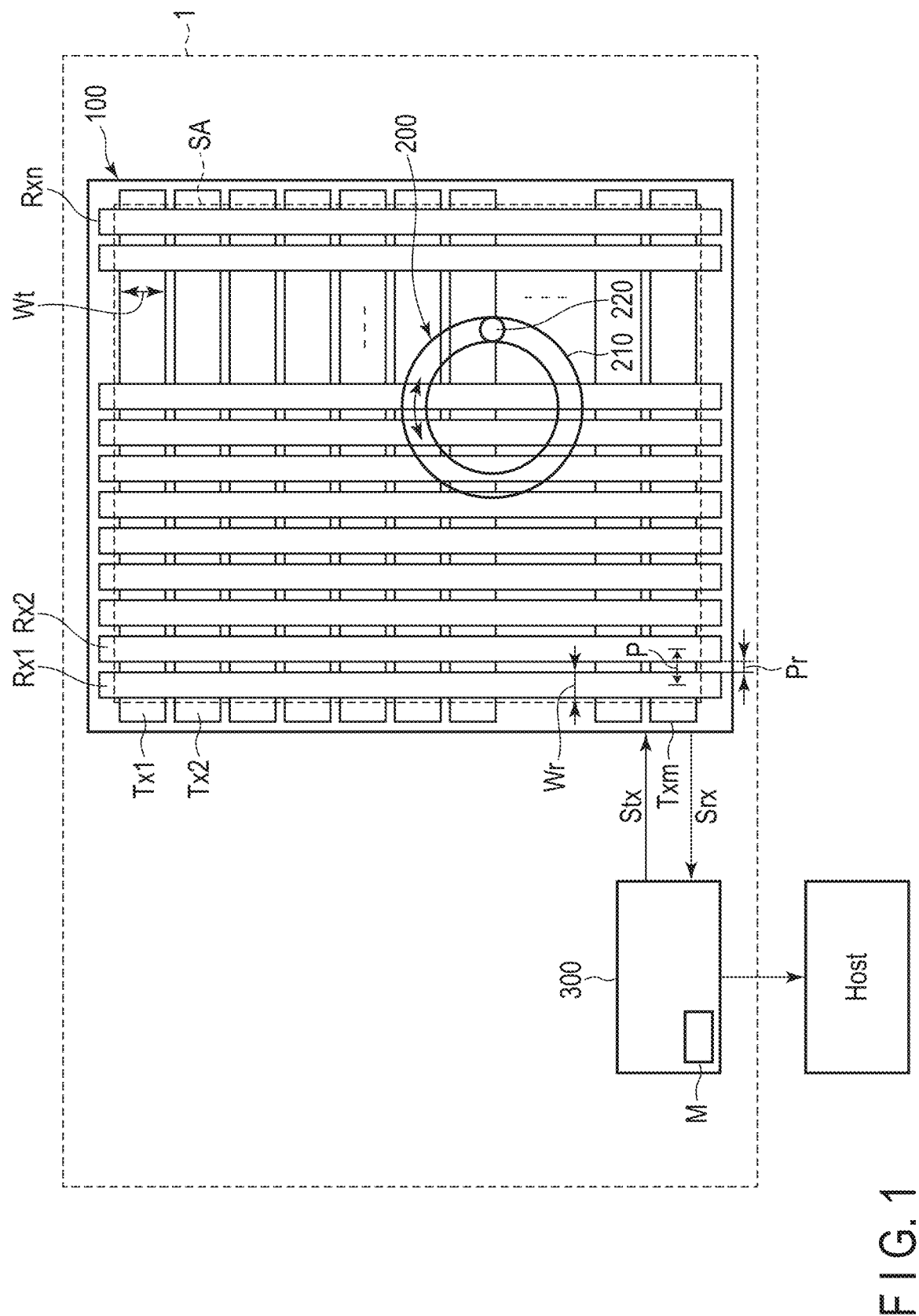
FIG. 1 is an illustration showing a configuration example of a sensor device 1 according to the present embodiment.

In general, according to one embodiment, there is provided a sensor device comprising an electrostatic capacitive touch panel, a knob disposed rotatably about a rotation axis, a conductor held by the knob and opposed to the touch panel on a part of a circumference about the rotation axis, and a sensor controller which controls the touch panel. The sensor controller holds a reference signal corresponding to an electrostatic capacitance in a state where the conductor is not opposed to the touch panel. In a first sensing period, the sensor controller detects first coordinates of the conductor based on a first sensor signal received from the touch panel in a state where the conductor is opposed to a first position of the touch panel and the reference signal.

According to another embodiment, there is provided a sensor device comprising an electrostatic capacitive touch panel, a knob disposed rotatably about a rotation axis, a conductor held by the knob and opposed to the touch panel on a part of a circumference about the rotation axis, and a sensor controller which controls the touch panel. In a first sensing period, the sensor controller generates a baseline based on a first sensor signal received from the touch panel in a state where the conductor is opposed to a first position of the touch panel. In a second sensing period, the sensor controller generates raw data based on a second sensor signal received from the touch panel in a state where the conductor is opposed to a second position of the touch panel. The sensor controller calculates delta corresponding to a difference value between the baseline and the raw data. The sensor controller calculates a signal ratio based on a first integral value of a negative signal and a second integral value of a positive signal in the delta. The sensor controller detects a rotation angle of the conductor based on the signal ratio.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed descriptions thereof which are considered redundant are omitted unless necessary.

FIG. 1 is an illustration showing a configuration example of a sensor device 1 according to the present embodiment. The sensor device 1 comprises a touch panel 100, an input device 200 and a sensor controller 300. The touch panel 100 is, for example, an electrostatic capacitive touch panel. Here, the mutual capacitive touch panel 100 will be described.

The touch panel 100 comprises a plurality of drive electrodes Tx and a plurality of detection electrodes Rx. M drive electrodes Tx1 to Txm are arranged at intervals in one direction. N detection electrodes Rx1 to Rxn are arranged at intervals, and are disposed intersecting the drive electrodes Tx1 to Txm. A region SA in which the drive electrodes Tx1 to Txm and the detection electrodes Rx1 to Rxn intersect each other corresponds to a detection region in which a contact or approach of an object with or to the touch panel 100 is detected. It should be noted that m and n each are an integer of greater than or equal to 2.

The sensor controller 300 controls the touch panel 100. That is, the sensor controller 300 transmits a drive signal Stx to the drive electrode Tx. The detection electrode Rx outputs a sensor signal Srx necessary for sensing when the drive signal Stx is supplied to the drive electrode Tx. The sensor signal Srx is a signal based on an electrostatic capacitance (hereinafter referred to simply as a capacitance) of the drive electrode Tx and the detection electrode Rx.

In the present embodiment, a period for transmitting the drive signal Stx to each of the drive electrodes Tx1 to Txm is referred to as one sensing period (or one frame). In one sensing period, the sensor controller 300 receives the sensor signal Srx output from each of the detection electrode Rx1 to Rxn, detects the presence or absence of an object contacting or approaching the touch panel 100, and detects the position coordinates or the like of the object.

The input device 200 is mounted in the detection region SA of the touch panel 100. Although the details of the input device 200 will be described later, the input device 200 comprises a rotatably disposed knob 210, and a conductor 220 held by the knob 210. The conductor 220 is opposed to and in contact with the touch panel 100. It should be noted that the conductor 220 may be disposed close to the touch panel 100 without contacting the touch panel 100 while being opposed to the touch panel 100.

The sensor controller 300 transmits the drive signal Stx to each of the drive electrodes Tx1 to Txm, receives the sensor signal Srx output from each of the detection electrodes Rx1 to Rxn, and detects rotation information of the knob 210 and pressing information of the knob 210. The rotation information includes the rotation angle of the knob 210, the position coordinates of the conductor 220, and the like. The pressing information includes the presence or absence of the pressing operation of the knob 210, the position coordinates of the conductor 220 when the knob 210 is pressed, and the like.

This sensor controller 300 incorporates a memory M. The memory M stores various programs necessary for detecting the above-described rotation information and pressing information, and data corresponding to a reference signal or the like. The reference signal is a signal corresponding to an electrostatic capacitance in a state where the conductor 220 is not opposed to the touch panel 100, and corresponds to a signal equivalent to the sensor signal Srx output from the detection electrode Rx when the drive signal Stx is transmitted to the drive electrode Tx. That is, the reference signal is a signal corresponding to the mutual capacitance of one drive electrode Tx and one detection electrode Rx. The memory M also stores a reference signal over the entire region of the detection region SA, that is, a signal corresponding the mutual capacitance of all the drive electrodes Tx1 to Txm and all the detection electrodes Rx1 to Rxn. The sensor controller 300 transmits the detected rotation information and pressing information to the host side.

It should be noted that the touch panel 100 is not limited to a mutual capacitance type but may be a self-capacitance type.

Figure 2:
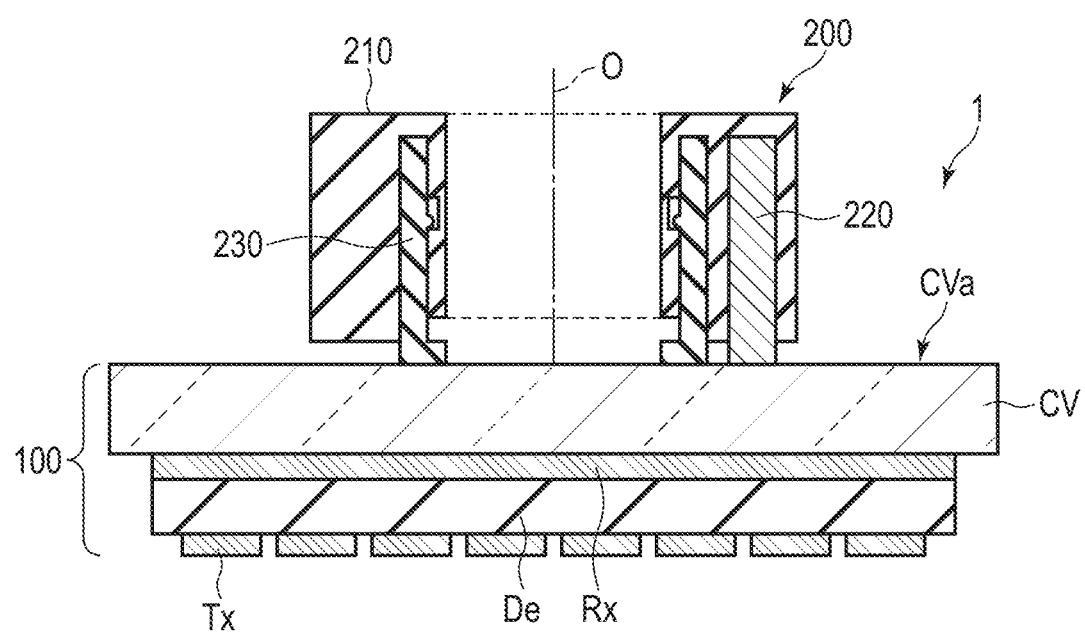
FIG. 2 is a cross-sectional view showing the main part of the sensor device 1 shown in FIG. 1.

FIG. 2 is a cross-sectional view showing the main part of the sensor device 1 shown in FIG. 1. The touch panel 100 comprises a dielectric layer De and a cover member CV in addition to the drive electrodes Tx and the detection electrodes Rx. The dielectric layer De is located between the drive electrodes Tx and the detection electrodes Rx. The cover member CV covers the detection electrodes Rx. A surface CVa of the cover member CV is a surface which faces the user, and is a surface which can be touched by the user or object. The input device 200 is disposed on the surface CVa. The detection electrodes Rx are located between the drive electrodes Tx and the input device 200.

The input device 200 comprises a fixture 230 in addition to the knob 210 and the conductor 220. The fixture 230 is fixed to the touch panel 100 by being bonded or the like to the surface CVa. The knob 210 is disposed rotatably with respect to the fixture 230. The knob 210 is apart from the surface CVa. In the illustrated example, the knob 210 and the fixture 230 are formed in a tubular shape extending along a rotation axis O. The rotation axis O is, for example, orthogonal to the surface CVa. The knob 210 and the fixture 230 are formed of an insulating material. The conductor 220 is located more outward than the fixture 230 and is held by the knob 210. The tip of the conductor 220 is in contact with the surface CVa. A state where the conductor 220 is in contact with the touch panel 100 here corresponds to a state where the conductor 220 is in contact with the cover member CV of the touch panel 100.

Figure 3:
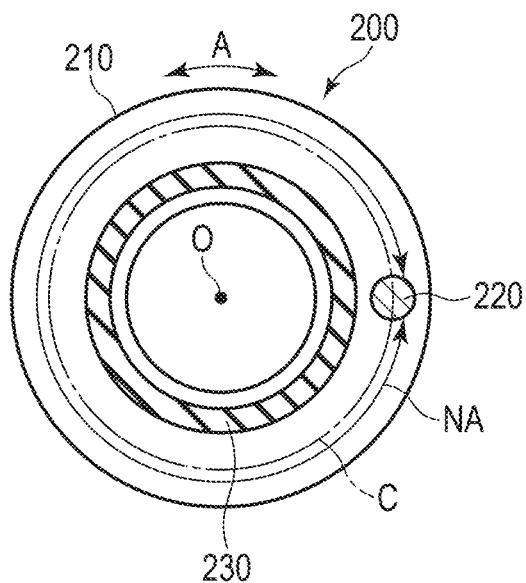
FIG. 3 is an illustration showing the first configuration example of an input device 200.

FIG. 3 is an illustration showing the first configuration example of the input device 200. A circumference C about the rotation axis O at a position overlapping the knob 210 is shown by a dashed-dotted line.

The conductor 220 is located on a part of the circumference C. In the present embodiment, the conductor 220 is formed in a non-annular shape, and a non-effective region NA in which the conductor is not present is formed on the circumference C. In the illustrated example, the conductor 220 is formed in a dot shape on the circumference C. The length along the circumference C of the conductor 220 is less than the length along the circumference C of the non-effective region NA. The conductor 220 is opposed to and in contact with the touch panel 100 as described with reference to FIG. 2, but the non-effective region NA is apart from the touch panel 100.

When the knob 210 is rotated along an arrow A in the drawing about the rotation axis O, the conductor 220 moves on the circumference C. Since the conductor 220 is held by the knob 210, the rotation angle of the conductor 220 is equal to the rotation angle of the knob 210.

Figure 4:
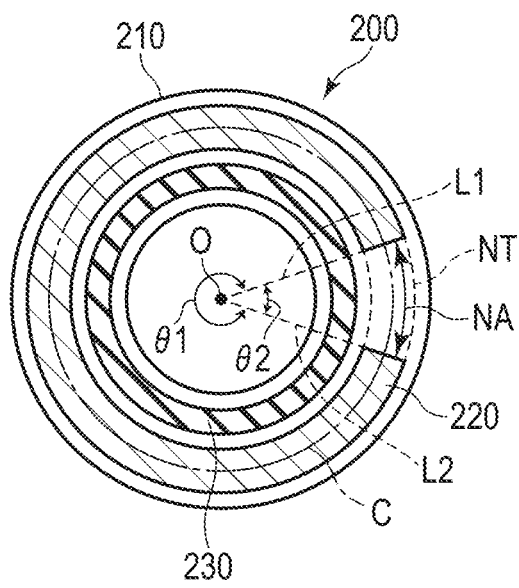
FIG. 4 is an illustration showing the second configuration example of the input device 200.

FIG. 4 is an illustration showing the second configuration example of the input device 200. The second configuration example shown in FIG. 4 is different from the first configuration example shown in FIG. 3 in that the conductor 220 is formed in a C shape. That is, the conductor 220 extends along the circumference C, and has a notch NT on a part of the circumference C. A region overlapping the notch NT on the circumference C corresponds to the non-effective area NA. The length along the circumference C of the conductor 220 is greater than ½ of the circumference C. That is, the length along the circumference C of the conductor 220 is greater than the length along the circumference C of the non-effective region NA. Alternatively, when a line L1 connecting the rotation axis O and one end of the conductor 220 and a line L2 connecting the rotation axis O and the other end of the conductor 220 are defined, a central angle θ1 on a side along the conductor 220 is greater than a central angle θ2 on a side along the notch NT. In addition, the central angle θ1 is greater than 180°. The conductor 220 of the second configuration example is also opposed to and in contact with the touch panel 100 as shown in FIG. 2, but the notch NT is apart from the touch panel 100.

Figure 5A:
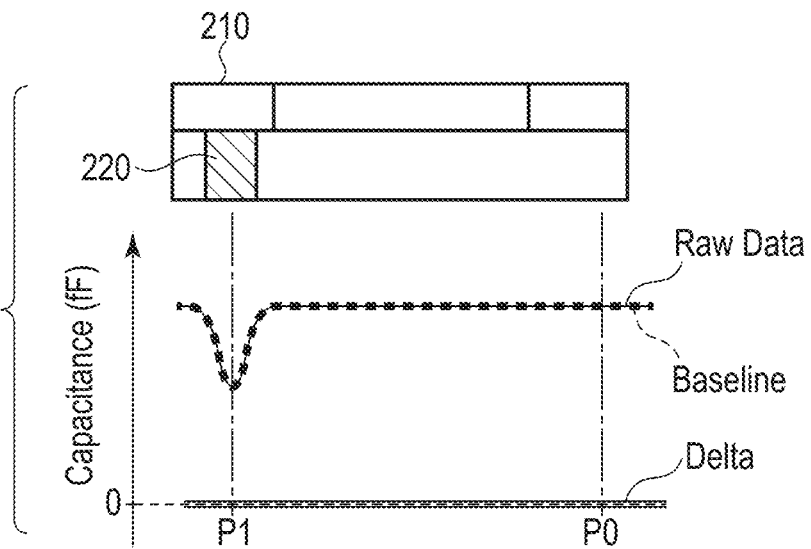
FIG. 5A is an illustration for explaining a method for detecting rotation information of a knob 210 (or a conductor 220).
Figure 5B:
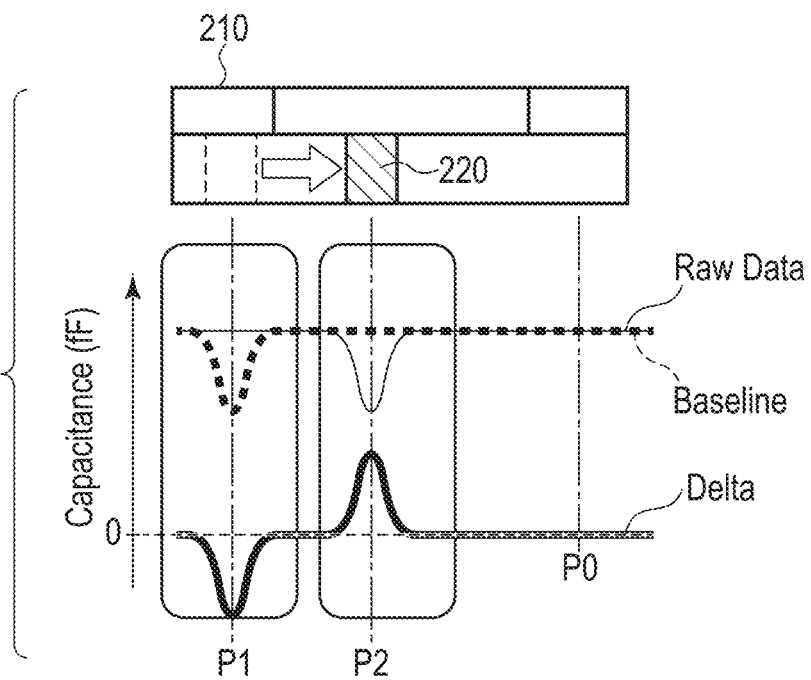
FIG. 5B is an illustration for explaining a method for detecting rotation information of the knob 210 (or the conductor 220).

FIGS. 5A and 5B each are an illustration for explaining a method for detecting the rotation information of the knob 210 (or the conductor 220). FIG. 5A is an illustration for explaining an initial state immediately after the power is turned on, and FIG. 5B is an illustration for explaining a state after the knob 210 is rotated.

In the method described here, a baseline is data obtained by plotting, for example, m*n first sensor signals based on the mutual capacitances between m drive electrodes Tx and n detection electrodes Rx in the first sensing period immediately after the power is turned on.

Raw data is data obtained by plotting, for example, m*n second sensor signals based on the mutual capacitances between m drive electrodes Tx and n detection electrodes Rx in the second sensing period after the first sensing period. This raw data is updated every sensing period.

Delta is data corresponding to a difference value [(baseline)−(raw data)] in each sensing period.

The baseline shown by a dotted line in the drawing and the raw data shown by a solid line in the drawing are data obtained when one drive electrode Tx is driven.

As shown in FIG. 5A, in the initial state, the conductor 220 is in contact with the touch panel 100 at a first position P1. The raw data value of the first position P1 is less than the raw data value of the other position P0 at which the conductor 220 is not placed. The raw data values of the other positions at which the conductor 220 is not placed are all the same level. In this initial state, the raw data matches the baseline. Therefore, the delta is zero over the entire region regardless of the position of the conductor 220.

As shown in FIG. 5B, in a state where the knob 210 is rotated, the conductor 220 is in contact with the touch panel 100 at a second position P2 and is removed from the first position P1. Also in this state, the baseline is the same as the initial state. The raw data value of the first position P1 increases from the initial state as the conductor 220 is removed, and becomes the same level as the raw data value of the other position P0 at which the conductor 220 is not placed. Therefore, the delta of the first position P1 becomes a negative signal.

The raw data value of the second position P2 decreases from the initial state as the conductor 220 contacts, and becomes less than the raw data value of the other position P0 at which the conductor 220 is not placed. Therefore, the delta of the second position P2 becomes a positive signal.

The sensor controller 300 shown in FIG. 1 can detect the rotation information of the knob 210 (or the conductor 220) by analyzing the delta described with reference to FIG. 5B of the position over the entire region of the detection region SA. In the case of the above-described method, the sensor controller 300 detects the first coordinates (x1, y1) of the first position P1 based on the negative signal shown in FIG. 5B, and detects the second coordinates (x2, y2) of the second position P2 based on the positive signal. Then, the sensor controller 300 calculates the movement distance of the conductor 220 based on these first coordinates and second coordinates, and detects the rotation angle based on this movement distance.

At this time, when the first position P1 and the second position P2 are close to each other (for example, when the rotation angle of the knob 210 is equivalent to less than 30 degrees), the negative signal and the positive signal are adjacent to each other. Therefore, the detection accuracy of the coordinates based on the signals may decrease, and the error of the movement distance or the rotation angle may increase.

The first method for detecting the rotation information of the knob 210 (or the conductor 220) of the present embodiment will be described below.

Figure 6:
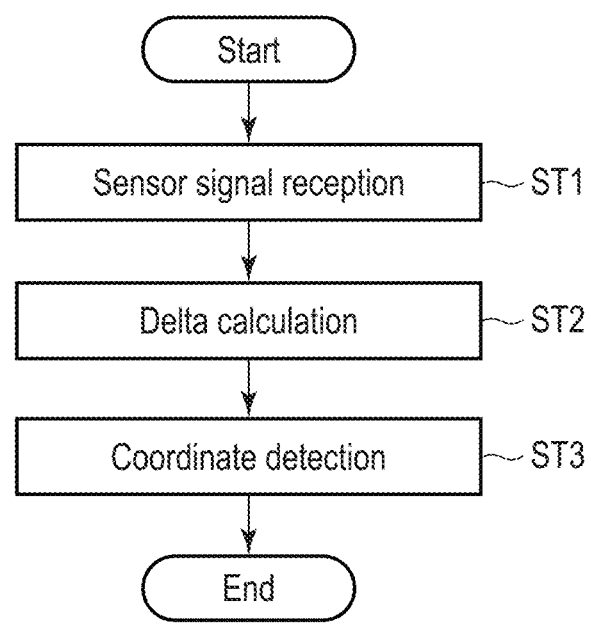
FIG. 6 is a flowchart for explaining a process of detecting the coordinates of the conductor 220.

FIG. 6 is a flowchart for explaining a process of detecting the coordinates of the conductor 220. The process described here is executed by the sensor controller 300 shown in FIG. 1. In addition, the sensor controller 300 holds the reference signal as described with reference to FIG. 1.

The sensor controller 300 transmits the drive signal Stx to the drive electrode Tx of the touch panel 100 shown in FIG. 1 and receives the sensor signal Srx from each of n detection electrodes Rx first (step ST1). Based on the received sensor signal Srx and the reference signal stored in the memory M, the sensor controller 300 calculates delta corresponding to the difference value between the two (step ST2). Then, the sensor controller 300 detects the coordinates of the conductor 220 based on the calculated delta (step ST3).

In one sensing period, for example, the sensor controller 300 drives m drive electrodes Tx to Txm sequentially, receives the sensor signal from each of n detection electrodes Rx1 to Rxm, and detects the coordinates of the conductor 220 by analyzing the calculated delta. In the first sensing period, the sensor signal received from the detection electrode Rx corresponds to the first sensor signal, and the first coordinates (x1, y1) corresponding to the first position P1 of the conductor 220 are detected. In addition, in the second sensing period different from the first sensing period, the sensor signal received from the detection electrode Rx corresponds to the second sensor signal, and the second coordinate (x2, y2) corresponding to the second position P2 of the conductor 220 are detected.

Figure 7A:
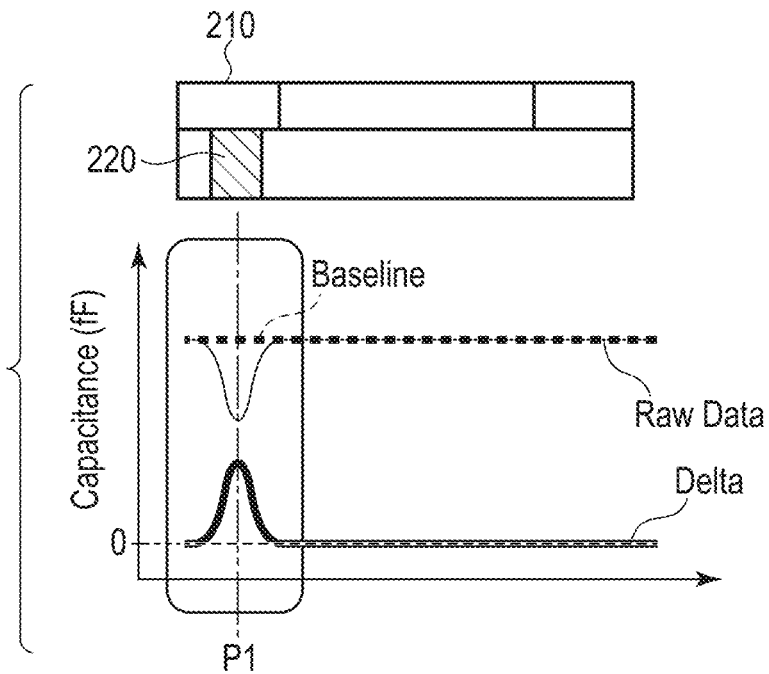
FIG. 7A is an illustration for explaining the process shown in FIG. 6.
Figure 7B:
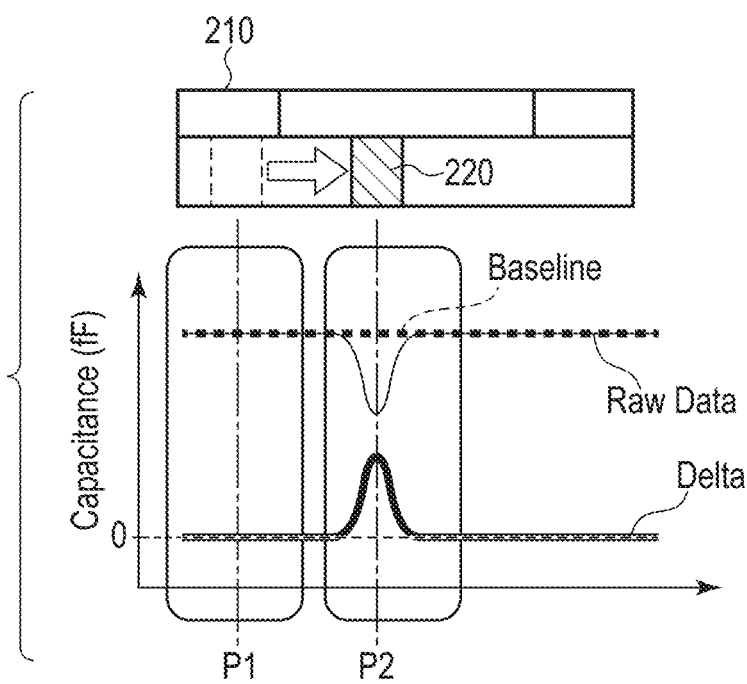
FIG. 7B is an illustration for explaining the process shown in FIG. 6.

FIGS. 7A and 7B each are an illustration for explaining the process shown in FIG. 6. FIG. 7A is an illustration for explaining the process of detecting the first coordinates (x1, y1) of the first position P1, and FIG. 7B is an illustration for explaining the process of detecting the second coordinates (x2, y2) of the second position P2.

A baseline in the drawing is obtained by plotting a reference signal corresponding to the mutual capacitance of one drive electrode Tx and each of n detection electrodes Rx1 to Rxn. Raw data in the drawing is obtained by plotting the sensor signal received from each of n detection electrodes Rx in step ST1. Delta in the drawing is obtained by plotting the difference value [(reference signal)−(sensor signal)] between each sensor signal and each reference signal. In other words, delta is data correspond to the difference value [(baseline)−(raw data)].

In the example shown in FIG. 7A, in the first sensing period, the delta of the first position P1 of the delta calculated as the difference value between the reference signal and the first sensor signal becomes a positive signal. The delta of the other position becomes almost zero. By analyzing the delta calculated in the first sensing period, the sensor controller 300 determines that the position of the conductor 220 is the first position P1, and detects the first coordinates (x1, y1) corresponding to the first position P1.

In the example shown in FIG. 7B, in the second sensing period, the delta of the second position P2 of the delta calculated as the difference value between the reference signal and the second sensor signal becomes a positive signal. The delta of the other position including the first position P1 becomes almost zero. By analyzing the delta calculated in the second sensing period, the sensor controller 300 determines that the position of the conductor 220 is the second position P2, and detects the second coordinates (x2, y2) corresponding to the second position P2.

The first coordinates (x1, y1) and the second coordinates (x2, y2) are detected by analyzing the delta over the entire region of the detection region SA and calculating the barycenter of the delta. The x coordinate value of each of the first coordinates and the second coordinates corresponds to a value on the horizontal axis in the drawing and is a value defined by the detection electrodes Rx1 to Rxn, for example. In addition, the y coordinate value is a value defined by the drive electrodes Tx1 to Txm, for example.

Figure 8:
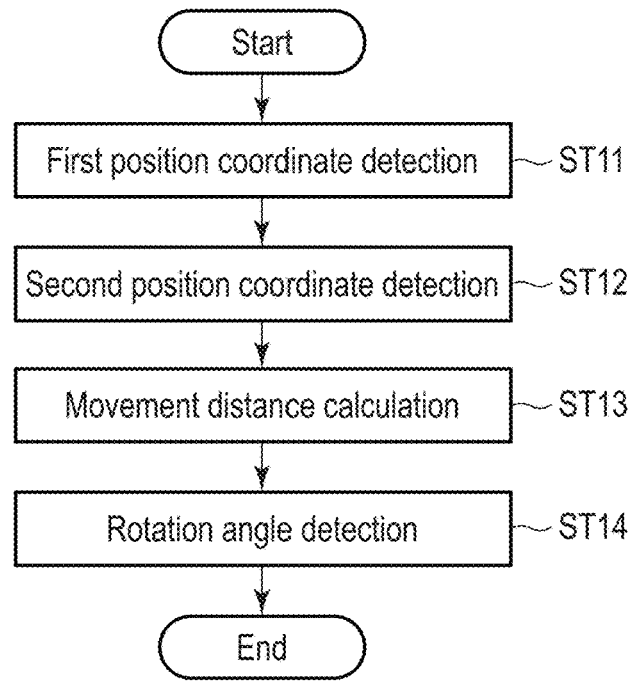
FIG. 8 is a flowchart for explaining a process of detecting the rotation angle of the conductor 220.

FIG. 8 is a flowchart for explaining a process of detecting the rotation angle of the conductor 220. First, the sensor controller 300 executes the process shown in FIGS. 6 and 7A and detects the first coordinates (x1, y1) of the first position P1 in the first sensing period (step ST11). Then, the sensor controller 300 executes the process shown in FIGS. 6 and 7B and detects the second coordinates (x2, y2) of the second position P2 in the second sensing period (step ST12).

Subsequently, the sensor controller 300 calculates the movement distance of the conductor 220 based on the first coordinates and the second coordinates (step ST13). Then, the sensor controller 300 detects the rotation angle of the conductor 220 (that is, the rotation angle of the knob 210) based on the calculated movement distance (step ST14). If the coordinates (x2, y2) detected in step ST12 match the coordinates (x1, y1) detected in step ST11 or if the movement distance calculated in step ST13 is zero, the sensor controller 300 determines that the rotation angle is 0°.

Figure 9:
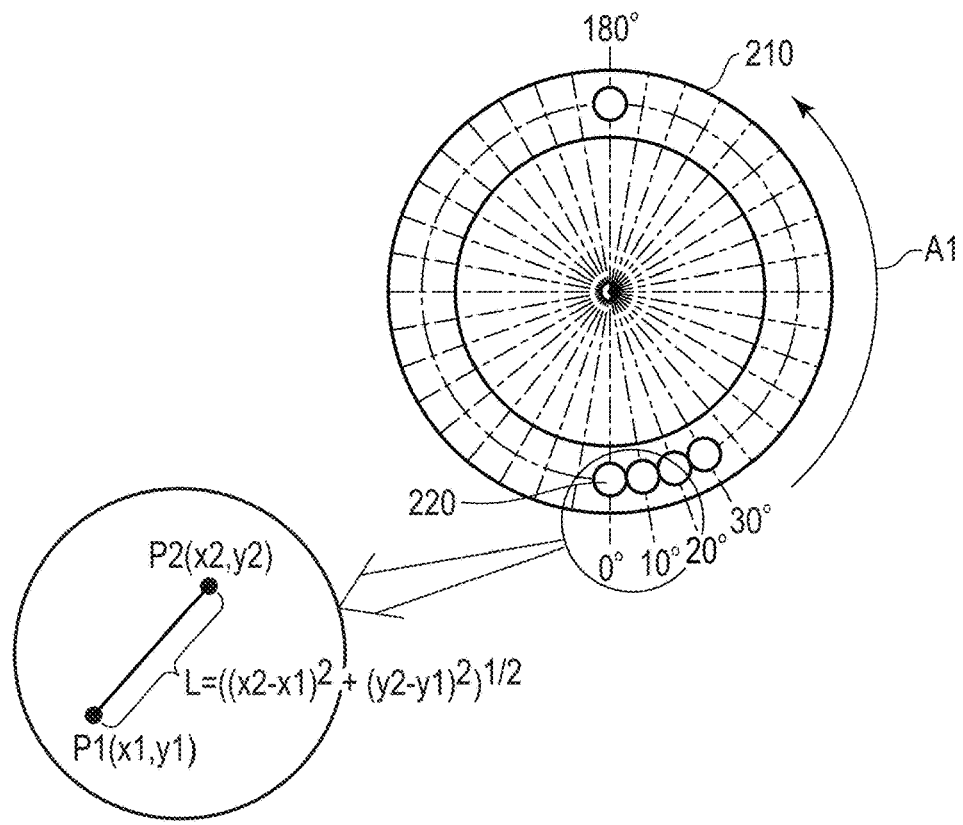
FIG. 9 is an illustration for explaining the process shown in FIG. 8.

FIG. 9 is an illustration for explaining the process shown in FIG. 8. Here, it is assumed that the knob 210 rotates with the conductor 220 in a direction shown by an arrow A1 (counterclockwise direction) and the rotation angle is detected in units of 10°. For example, a position of 0° in the drawing corresponds to the first position P1, and a position of 10°, 20° or 30° corresponds to the second position P2. A movement distance L of step ST13 shown in FIG. 8 is calculated as the direct distance between the coordinates (x1, y1) of the first position P1 detected in step ST11 and the coordinates (x2, y2) of the second position P2 detected in step ST12.

A minimum rotation angle θmin to be detected corresponds to the resolution in the sensor device 1 of the present embodiment. When the conductor 220 is rotated at the rotation angle θmin and the reference direct distance between two points between which the conductor 220 is moved is La, if the movement distance L calculated in step ST13 is greater than or equal to (La/2) but less than (3*La/2), the sensor controller 300 detects that the rotation angle is θmin. In one example, when the rotation angle θmin is 10° and the reference direct distance La between the two points is 4 mm, if the calculated movement distance L is greater than or equal to 2 mm but less than 6 mm, the sensor controller 300 detects that the rotation angle is 10°.

According to the present embodiment, the sensor controller 300 holds the reference signal corresponding to the mutual capacitance of the drive electrode Tx and the detection electrode Rx in a state where the conductor 220 is not opposed to the touch panel 100 in advance. While the first coordinates of the first position P1 and the second coordinates of the second position P2 are detected, signals having different polarities do not appear in the process of calculating the difference value between the reference signal and the sensor signal. In the above-described example, the difference values corresponding to the first position P1 and the second position P2 become positive signals, and no negative signal appears. Therefore, even if the first position P1 and the second position P2 are close to each other, the adjacent signals will not cancel each other out. Accordingly, the first coordinates and the second coordinates can be detected with high accuracy. In addition, the movement distance of the conductor 220 based on the first coordinates and the second coordinates, and the rotation angle of the knob 210 or the conductor 220 can be detected with high accuracy. Therefore, highly accurate sensing can be performed for detecting the rotation information of the knob 210.

Next, a correction method when the level of a sensor signal is shifted by a usage environment such as a temperature will be described.

FIG. 10 is a flowchart for explaining another process of detecting the coordinates of the conductor 220. The sensor controller 300 transmits a drive signal to the drive electrode Tx of the touch panel 100 shown in FIG. 1, and receives a sensor signal from each of n detection electrodes Rx1 to Rxn first (step ST21). Then, the sensor controller 300 calculates the average value of the received sensor signals (step ST22). The average value of the sensor signals is hereinafter referred to as a sensor average value. The sensor average value here is, for example, the average value of m*n sensor signals over the entire region of the detection region SA of the touch panel 100 shown in FIG. 1. In other words, the sensor controller 300 calculates the average value of the sensor signals received from n detection electrodes Rx1 to Rxn when m drive electrodes Tx1 to Txm are driven sequentially. It should be noted that the sensor controller 300 may calculate the average value of the sensor signals in a region of the detection region SA of the touch panel 100 in which the input device 200 is disposed.

Subsequently, the sensor controller 300 calculates an offset amount based on the difference value between the calculated sensor average value and the average value of reference signals (step ST23). The average value of reference signals is hereinafter referred to as a reference average value. The reference average value here is, for example, the average value of m*n reference signals over the entire region of the detection region SA. All the reference signals are stored in the memory M in advance as described above. In addition, the reference average value may also be stored in the memory M in advance. It should be noted that the average value of the reference signals in a region in which the input device 200 is disposed may be applied as the reference average value. It is preferable that a region in which the reference average value is calculated matches a region in which the sensor average value is calculated. The offset amount becomes a negative value when the sensor average value is greater than the reference average value, and becomes a positive value when the sensor average value is less than the reference average value.

Subsequently, the sensor controller 300 calculates a corrected sensor signal based on the sensor signal received in step ST21 and the offset amount calculated in step ST23 (step ST24). For example, when the sensor average value is greater than the reference average value, the sum of the received sensor signal and the negative offset amount becomes the corrected sensor signal. In addition, when the sensor average value is less than the reference average value, the sum of the received sensor signal and the positive offset amount becomes the corrected sensor signal. When m*n sensor signals are received, m*n corrected sensor signals are calculated.

Subsequently, based on the calculated corrected sensor signal and the reference signal stored in the memory M, the sensor controller 300 calculates delta corresponding to the difference value between the two (step ST25). Then, the sensor controller 300 detects the coordinates of the conductor 220 based on the calculated delta (step ST26).

The above-described correction method may be applied every time in each sensing period or may be applied periodically at predetermined intervals.

In the present embodiment, the reference signal stored in the memory M is set in advance based on the assumption that the sensor device 1 is used in a room temperature environment (for example, 25° C.), for example. On the other hand, if the sensor device 1 of the present embodiment is used in an environment different from the room temperature environment, the sensor signal does not necessarily match that of the room temperature environment. For example, when a situation where the sensor device 1 is used in the room temperature environment is compared with a situation where the sensor device 1 is used in a high temperature environment (for example, 50° C.), the sensor signal when the sensor device 1 is used in the high temperature environment tends to be higher than the sensor signal when the sensor device 1 is used in the room temperature environment. In addition, when a situation where the sensor device 1 is used in the room temperature environment is compared with a situation where the sensor device 1 is used in a low temperature environment (for example, 0° C.), the sensor signal when the sensor device 1 is used in the low temperature environment tends to be lower than the sensor signal when the sensor device 1 is used in the room temperature environment.

According to the present embodiment, it is possible to perform highly accurate sensing even when the usage environment (such as the temperature, humidity or atmospheric pressure) of the sensor device 1 changes by appropriately applying the correction method shown in FIG. 10.

Figure 11B:
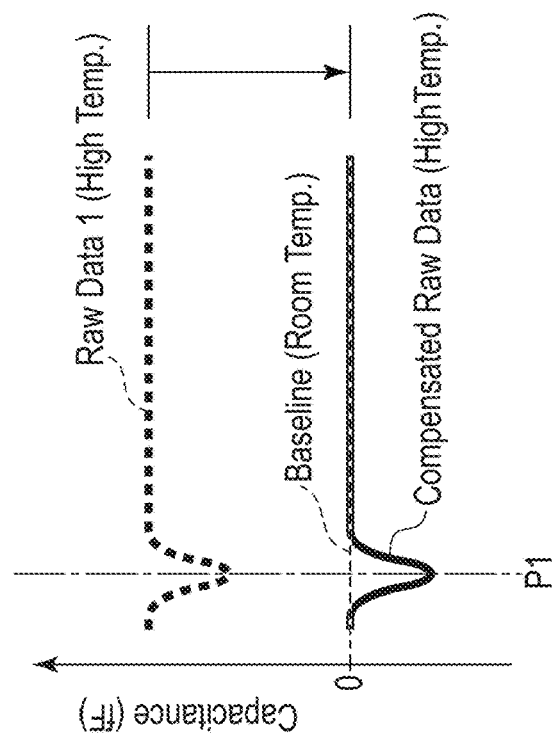
FIG. 11B is an illustration for explaining the correction method when the sensor device 1 of the present embodiment is used in the high temperature environment.
Figure 11A:
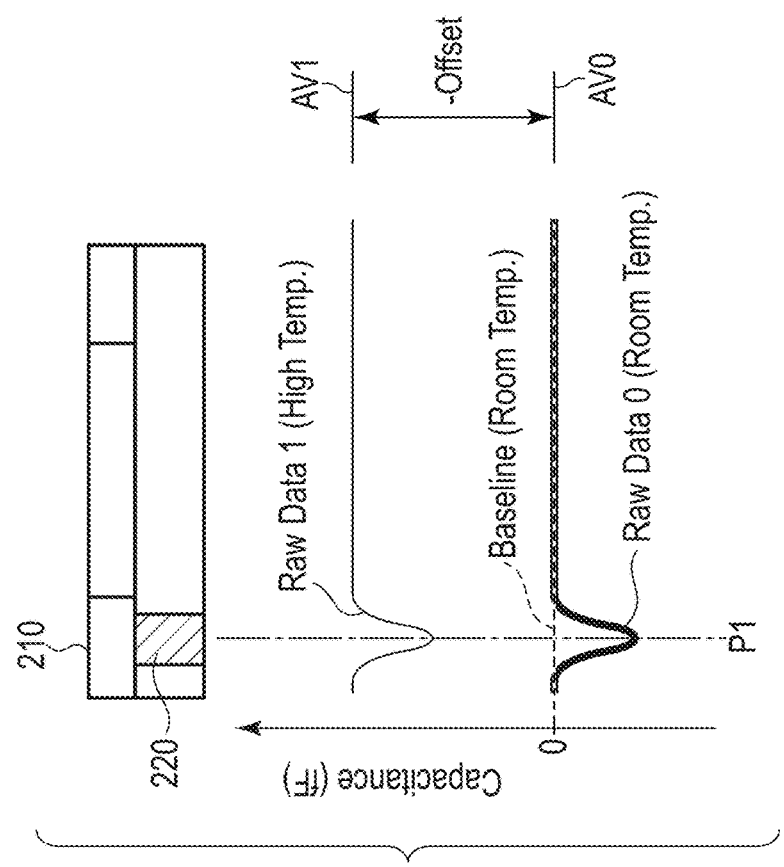
FIG. 11A is an illustration for explaining a correction method when the sensor device 1 of the present embodiment is used in a high temperature environment.

FIGS. 11A and 11B each are an illustration for explaining the correction method when the sensor device 1 of the present embodiment is used in the high temperature environment. FIG. 11A is an illustration for explaining the sensor signal before correction, and FIG. 11B is an illustration for explaining the corrected sensor signal.

In FIG. 11A, a baseline is obtained by plotting a reference signal in the room temperature environment. Raw data 0 illustrated for reference is obtained by plotting a sensor signal received from each of n detection electrodes Rx in step ST21 in the room temperature environment. When the sensor device 1 is used in the high temperature environment, a sensor signal higher than each sensor signal of the raw data 0 is obtained. Raw data 1 is obtained by plotting a sensor signal received from each of n detection electrodes Rx in step ST21 in the high temperature environment. As shown in the drawing, the raw data 1 is shifted to higher than the raw data 0.

A sensor average value AV1 calculated in step ST22 corresponds to the average value of the sensor signals constituting the raw data 1. A reference average value AV0 corresponds to the average value of the reference signals constituting the baseline. The sensor average value AV1 is greater than the reference average value AV0. An offset amount calculated in step ST23 corresponds to a difference value (reference value AV0−sensor average value AV1) and becomes a negative value.

In FIG. 11B, corrected raw data shown by a solid line corresponds to the sum of the raw data 1 shown by a dotted line and the negative offset amount. That is, in step ST24, a corrected sensor signal corresponding to the sum of the sensor signal received in step ST21 and the negative offset amount calculated in step ST23 is calculated. The corrected raw data shown in the drawing corresponds to the plot of the calculated corrected sensor signal.

Figures 12A, 12B:
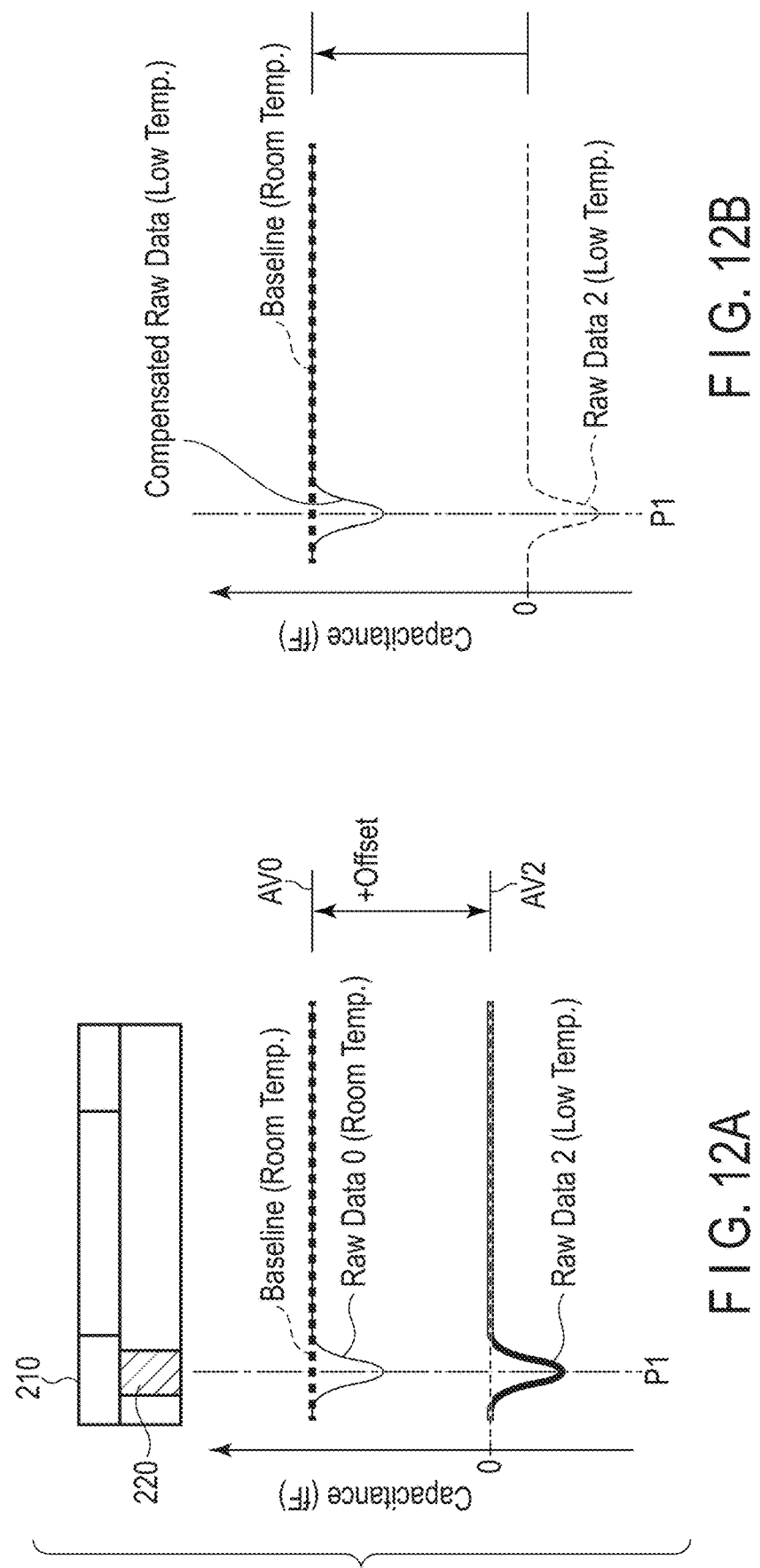
FIG. 12A is an illustration for explaining a correction method when the sensor device 1 of the present embodiment is used in a low temperature environment.
FIG. 12B is an illustration for explaining the correction method when the sensor deice 1 of the present embodiment is used in the low temperature environment.

FIGS. 12A and 12B each are an illustration for explaining the correction method when the sensor device 1 of the present embodiment is used in the low temperature environment. FIG. 12A is an illustration for explaining the sensor signal before correction, and FIG. 12B is an illustration for explaining the corrected sensor signal.

As shown in FIG. 12A, when the sensor device 1 is used in the low temperature environment, a sensor signal lower than each sensor signal of the raw data 0 is obtained. Raw data 2 is obtained by plotting a sensor signal received from each of n detection electrodes Rx in step ST21 in the low temperature environment. As shown in the drawing, the raw data 2 is shifted to lower than the raw data 0.

A sensor average value AV2 calculated in step ST22 corresponds to the average value of the sensor signals constituting the raw data 2. The sensor average value AV2 is less than the reference average value AV0. An offset amount calculated in step ST23 corresponds to a difference value (reference average value AV0−sensor average value AV2) and becomes a positive value.

In FIG. 12B, corrected raw data shown by a solid line corresponds to the sum of the raw data 2 shown by a dotted line and the positive offset amount. That is, in step ST24, a corrected sensor signal corresponding to the sum of the sensor signal received in step ST21 and the positive offset amount calculated in step ST23 is calculated. The corrected raw data shown in the drawing corresponds to the plot of the calculated corrected sensor signal.

In step ST25, delta corresponding to the difference value between the corrected raw data and the baseline shown in FIGS. 11A, 11B, 12A and 12B is calculated. In step ST26, the first coordinates of the conductor 220 are calculated based on the calculated delta.

In the first sensing period, the first coordinates of the conductor 220 located at the first position P1 are detected. In the second sensing period, the second coordinates of conductor 220 located at the second position P2 are detected similarly. Then, the movement distance of the conductor 220 is calculated in step ST13 shown in FIG. 8, and the rotation angle of the conductor 220 (that is, the rotation angle of the knob 210) is detected in step ST14.

Therefore, the first coordinates, the second coordinates, the movement distance and the rotation angle can be detected with high accuracy regardless of the usage environment of the sensor device 1.

Next, the second method for detecting the rotation angle of the knob 210 (or the conductor 220) of the present embodiment will be explained.

Figure 13:
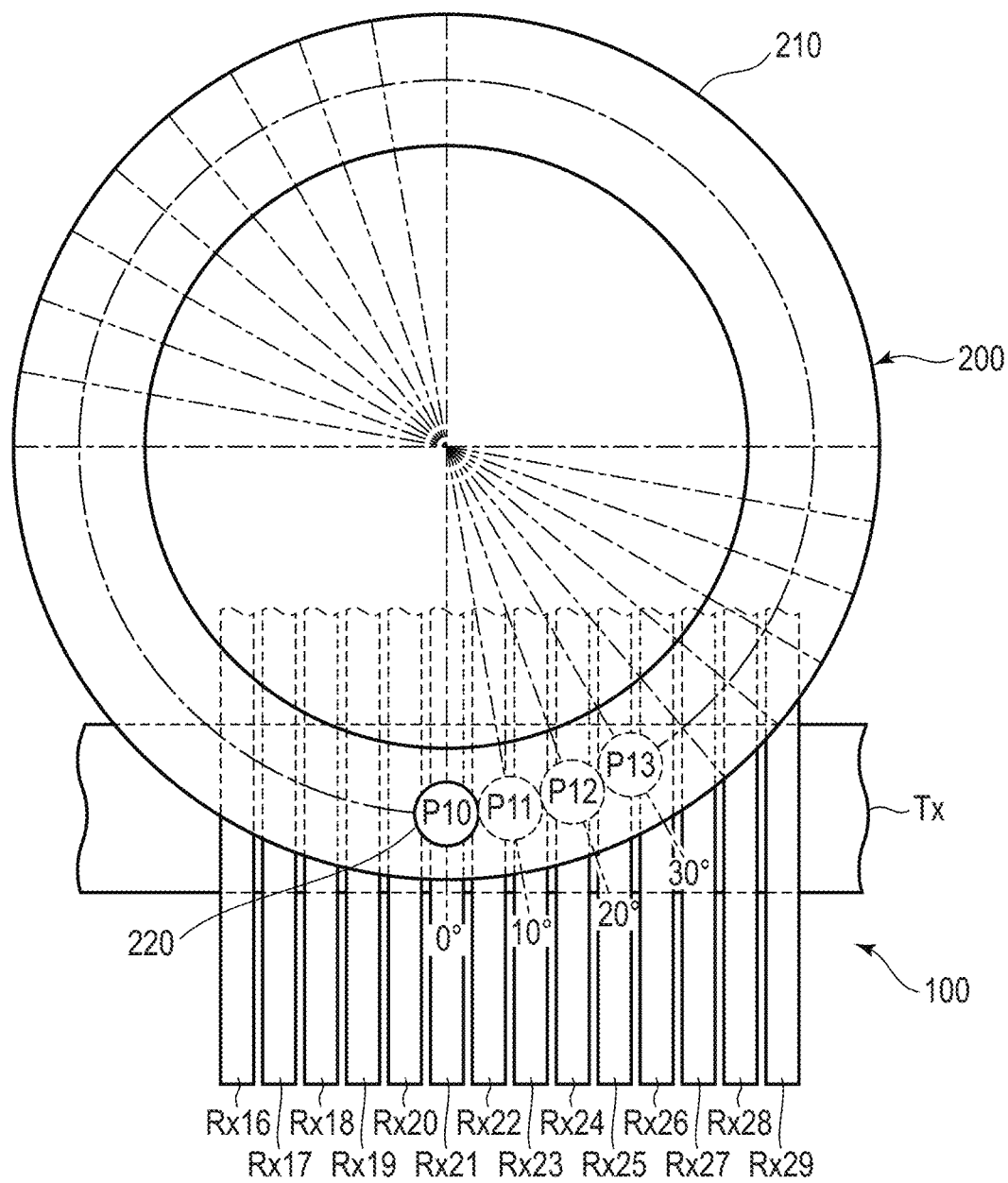
FIG. 13 is an illustration showing an example of a state where a touch panel 100 and the input device 200 overlap each other.

FIG. 13 is an illustration showing an example of a state where the touch panel 100 and the input device 200 overlap each other. In the illustrated example, as for the touch panel 100, the drive electrode Tx and the detection electrodes Rx16 to Rx29 are illustrated. In addition, as for the input device 200, a position P10 at which the conductor 220 is disposed in the initial state corresponds to a position at which the rotation angle is 0°. A position P11 at which the rotation angle is 10° with respect to the position P10, a position P12 at which the rotation angle is 20° with respect to the position P10, and a position P13 at which the rotation angle is 30° with respect to the position P10 all are a position to which the conductor 220 can be moved. The positions P10 to P13 overlap a region in which one drive electrode Tx and the detection electrodes Rx16 to Rx29 intersect each other.

FIG. 14 is a flowchart for explaining another process of detecting the rotation angle of the conductor 220. The sensor controller 300 transmits the drive signal to the drive electrode Tx and receives the first sensor signal from each of the detection electrodes Rx including the detection electrodes Rx16 to Rx29 in the first sensing period immediately after the power is turned on (the initial state) (step ST31). Then, the sensor controller 300 generates the baseline based on the received first sensor signal (step ST32).

Subsequently, the sensor controller 300 transmits the drive signal to the drive electrode Tx and receives the second sensor signal from each of the detection electrodes Rx including the detection electrodes Rx16 to Rx29 in the second sensing period after the first sensing period (step ST33). Then, the sensor controller 300 generates the raw data based on the received second sensor signal (step ST34).

Subsequently, the sensor controller 300 calculates the delta corresponding to the difference value between the generated baseline and raw data (step ST35). Then, the sensor controller 300 calculates the sum of the first integral value of the negative signal and the second integral value of the positive signal in the calculated delta (step ST36). The sum of the first integral value and the second integral value is hereinafter referred to as a signal sum S. Then, the sensor controller 300 calculates a signal ratio S/Smax which will be described later based on the calculated signal sum S (step ST37).

Subsequently, the sensor controller 300 determines whether the calculated signal ratio is less than 90% or not in step (step ST38). If the signal ratio is determined to be less than 90% (YES in step ST38), the sensor controller 300 detects the rotation angle of the conductor 220 based on the calculated signal ratio (step ST39).

On the other hand, if the signal ratio is determined to be greater than or equal to 90% (NO in step ST38), the sensor controller 300 detects the first coordinates (x1, y1) of the first position P1 based on the negative signal (step ST40). Then, the sensor controller 300 detects the second coordinates (x2, y2) of the second position P2 based on the positive signal (step ST41). Then, the sensor controller 300 calculates the movement distance of the conductor 220 based on the first coordinates and the second coordinates (step ST42). Then, the sensor controller 300 detects the rotation angle of the conductor 220 based on the calculated movement distance (step ST43).

Figure 15:
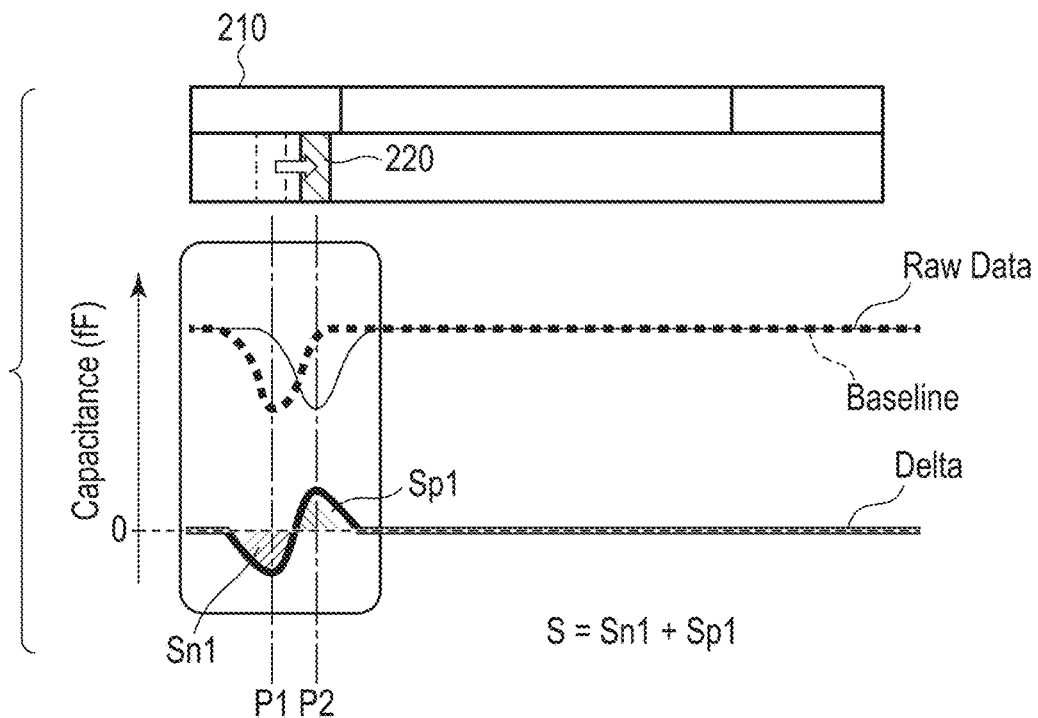
FIG. 15 is an illustration for explaining a state where the rotation angle (or movement distance) of the conductor 220 is small.

FIG. 15 is an illustration for explaining a state where the rotation angle (or the movement distance) of the conductor 220 is small. A baseline in the drawing is generated in step ST32. The first position P1 of the conductor 220 when the baseline is generated corresponds to the position P10 of 0° shown in FIG. 13. That is, the first sensor signal necessary for generating the baseline is received from the touch panel 100 in a state where the conductor 220 is opposed to the first position P1 (the position of 0° shown in FIG. 13) of the touch panel 100. The illustrated baseline is obtained by plotting the first sensor signal from each of the detection electrodes Rx including the detection electrodes Rx16 to Rx29.

Raw data in the drawing is generated in step ST34. The second position P2 of the conductor 220 when the raw data is generated corresponds to the position P11 of 10°, the position P12 of 20° or the position of 30° shown in FIG. 13. That is, the second sensor signal necessary for generating the raw data is received from the touch panel 100 in a state where the conductor 220 is opposed to the second position P2 (the position P11, the position P12 or the position P13 shown in FIG. 13) of the touch panel 100. The illustrated raw data is obtained by plotting the second sensor signal from each of the detection electrodes Rx including the detection electrodes Rx16 to Rx29.

Delta shown in the drawing is calculated as a difference value [(baseline)−(raw data)] in step ST35. The delta of the first position P1 becomes a negative signal, and the delta of the second position P2 becomes a positive signal. When the rotation angle (or the movement distance) of the conductor 220 is small, the negative signal of the first position P1 and the positive signal of the second position P2 become close to each other. Therefore, the negative signal and the positive signal partially cancel each other out, and the signal level (capacitance magnitude) of the delta tends to decrease.

The signal sum S calculated in step ST36 corresponds to the sum of a first integral value Sn1 of the negative signal and a second integral value Sp1 of the positive signal. It should be noted that the first integral value Sn1 and the second integral value Sp1 do not exactly correspond to areas in the drawing. That is, the delta when one drive electrode Tx is driven is shown in the illustrated example, but the delta when the other drive electrode close to this drive electrode Tx is driven is also calculated separately. Then, the integral value of the negative signals in all the delta corresponds to the first integral value Sn1, and the integral value of the positive signals in all the delta corresponds to the second integral value Sp1. That is, the first integral value Sn1 corresponds to the volume of the negative signals distributed in three dimensions, and the second integral value Sp1 corresponds to the volume of the positive signals distributed in three dimensions.

Figure 16:
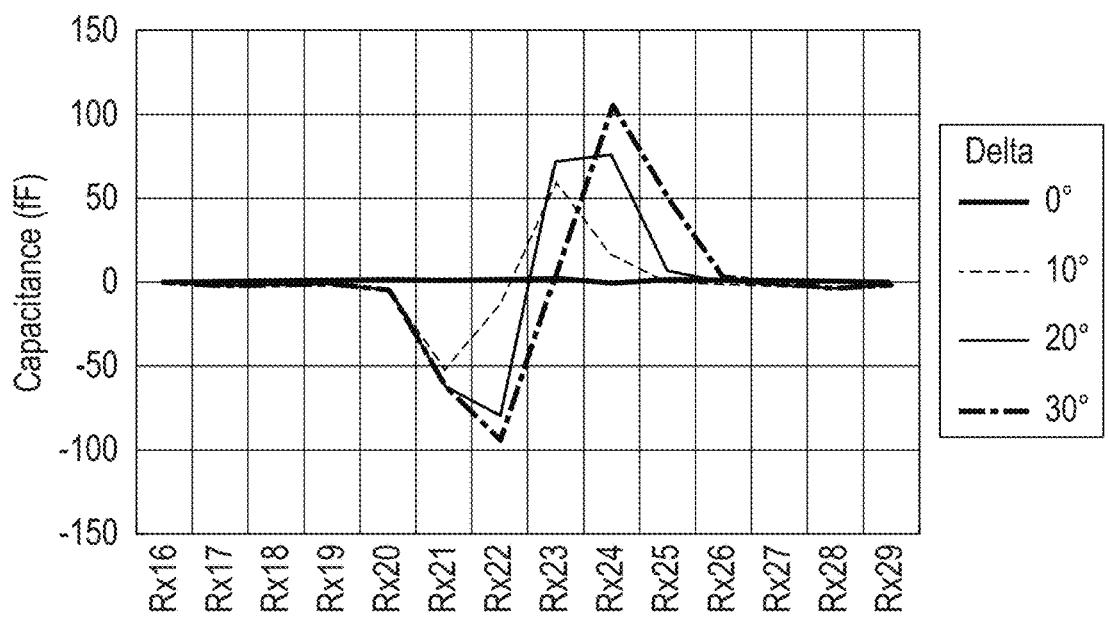
FIG. 16 is an illustration showing a calculation example of delta.

FIG. 16 is an illustration showing a calculation example of delta. When the rotation angle is 0° corresponds to when the second position P2 is the position P10 of 0° shown in FIG. 13. When the rotation angle is 10° corresponds to when the second position P2 is the position P11 of 10° shown in FIG. 13. When the rotation angle is 20° corresponds to when the second position P2 corresponds to the position P12 of 20° shown in FIG. 13. When the rotation angle is 30° corresponds to when the second position P2 corresponds to the position P13 of 30° shown in FIG. 13. In any case, the first position P1 is the position of 0° shown in FIG. 13.

The negative signal corresponds to when the signal level (capacitance magnitude) of delta is negative. The positive signal corresponds to when the signal level (capacitance magnitude) of delta is positive. As shown in the drawing, when the rotation angle is less than or equal to 30°, both the negative signal level and the positive signal level become lower as the rotation angle is smaller.

Figure 17:
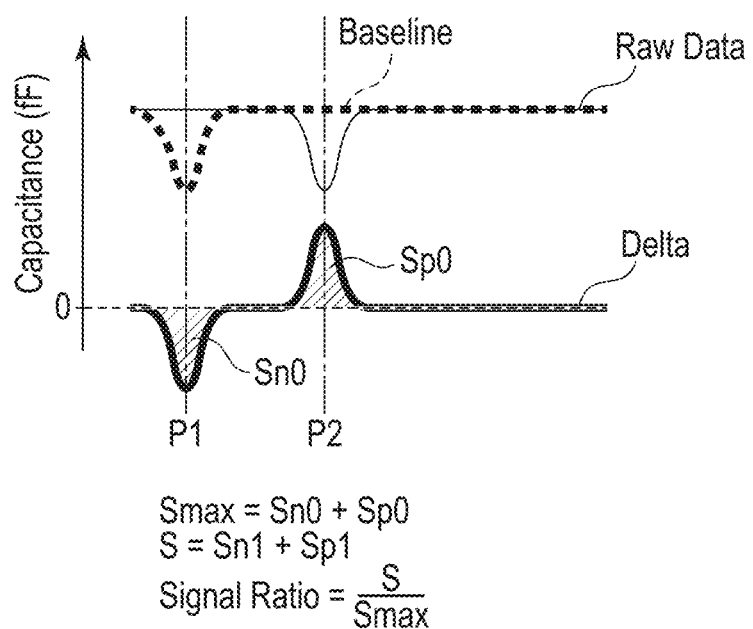
FIG. 17 is an illustration for explaining a signal ratio.

FIG. 17 is an illustration for explaining the signal ratio. The illustrated example shows a state where the first position P1 and the second position P2 are sufficiently far from each other, and corresponds to when the rotation angle of the conductor 220 is, for example, greater than or equal to 40°. As for the delta at this time, the negative signal obtained corresponding to the first position P1 and the positive signal obtained corresponding to the second position P2 are sufficiently far from each other and do not cancel each other out. Therefore, both the negative signal and the positive signal become maximum. A maximum value Smax of the signal sum corresponds to the sum of a third integral value Sn0 of the negative signal and a fourth integral value Sp0 of the positive signal. The maximum value Smax is a fixed value. The sensor controller 300 holds the maximum value Smax in advance. That is, the memory M shown in FIG. 1 stores the maximum value Smax.

It should be noted that the third integral value Sn0 and the fourth integral value Sp0 do not exactly correspond to areas in the drawing. As is the case with the signal sum S shown in FIG. 15, the third integral value Sn0 corresponds to the volume of the negative signals distributed in three dimensions, and the fourth integral value Sp0 corresponds to the volume of the positive signals distributed in three dimensions.

The signal ratio (Signal Ratio) calculated in step ST37 is defined as the ratio (=S/Smax) between the calculated signal sum S and the maximum value Smax of the signal sum which is a fixed value.

Figure 18A:
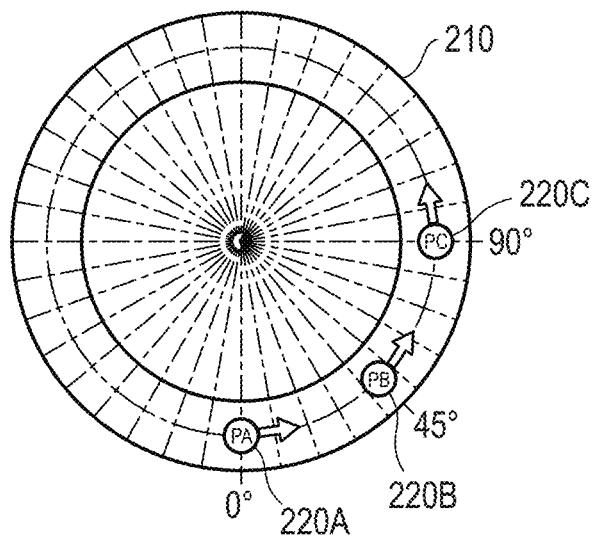
FIG. 18A is an illustration for explaining the relationship between the rotation angle and the signal ratio.
Figure 18B:
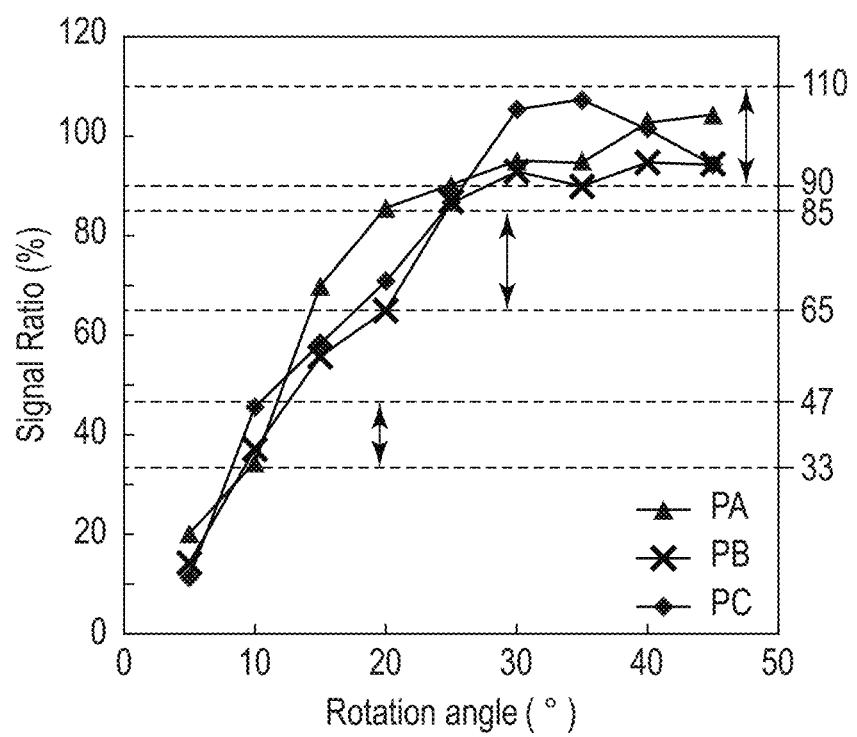
FIG. 18B is an illustration for explaining the relationship between the rotation angle and the signal ratio.

FIGS. 18A and 18B each are an illustration for explaining the relationship between the rotation angle and the signal ratio. A position PA shown in FIG. 18A corresponds to a position of 0°, a position PB corresponds to a position of 45° counterclockwise with respect to the position PA, and a position PC is a position of 90° counterclockwise with respect to the position PA. A conductor 220A at the position PA, a conductor 220B at the position PB, and a conductor 220C at the position PC all rotate counterclockwise.

FIG. 18B is an illustration showing the relationship between the rotation angle and the signal ratio. The vertical axis shows the rotation angle (°) of each of the conductor 220A rotating from the position PA, the conductor 220B rotating from the position PB, and the conductor 220C rotating from the position PC. The vertical axis shows the signal ratio (%). The illustrated relationship is the plot of the signal ratio calculated in steps ST31 to ST37 described above when each of the conductors 220A, 220B and 220C is rotated by 5°. As shown in the drawing, regardless of the position of the start of rotation, the signal ratio increases as the rotation angle increases.

When the rotation angle is 10°, the signal ratio is 33% to 47%. When the rotation angle is 20°, the signal ratio is 65% to 85%. When the rotation angle is 30°, the signal ratio is 90% to 110%.

In other words, it is possible to detect the rotation angle of less than 30° by calculating the signal ratio. That is, when the signal ratio is determined to be less than 90% in step ST38 described above (YES in step ST38), if the calculated signal ratio is in a range of 33% to 47%, the sensor controller 300 detects that the rotation angle is 10°. In addition, if the calculated signal ratio is in a range of 65% to 85%, the sensor controller 300 detects that the rotation angle is 20°.

On the other hand, if the rotation angle is greater than or equal to 30°, the signal ratio becomes greater than or equal to 90%, the angle becomes unable to be detected from the signal ratio. When the signal ratio is greater than or equal to 90% corresponds to a state where the first position P1 and the second position P2 are sufficiently far from each other as described with reference to FIG. 17. Therefore, the first coordinates, the second coordinates, the movement distance and the rotation angle are detected based on the negative signal obtained corresponding to the first position P1 and the positive signal obtained corresponding to the second position P2.

Also in the second method, highly accurate sensing can be performed as in the first method.

FIGS. 19A and 19B each are an illustration showing the third configuration example of the input device 200. FIG. 19A is a plan view showing the input device 200. FIG. 19B is a cross-sectional view of the sensor device 1 when the input device 200 shown in FIG. 19A is cut along line A-B.

As shown in FIG. 19A, the input device 200 comprises a first conductor 221 and a second conductor 22 which are located on the circumference C. Both the first conductor 221 and the second conductor 222 are held by the knob 210. In addition, the first conductor 221 and the second conductor 222 are apart from each other. The first conductor 221 and the second conductor 222 are electrically insulated from each other. The first conductor 221 is formed in a dot shape on the circumference C similarly to the first configuration example shown in FIG. 3. The second conductor 222 is formed in a C shape similarly to the second configuration example shown in FIG. 4. The first conductor 221 is located in the notch NT of the second conductor 222.

As shown in FIG. 19B, the first conductor 221 is in contact with the touch panel 100, and the second conductor 222 is apart from the touch panel 100. It should be noted that the second conductor 222 may be in contact with the touch panel 100 and the second conductor 221 may be apart from the touch panel 100. A spring 241 is disposed between the knob 210 and the first conductor 221. A spring 242 is disposed between the knob 210 and the fixture 230. The spring 242 is held between holding plates 251 and 252.

The springs 241 and 242 are compressed as the knob 210 is pressed toward the touch panel 100. The second conductor 222 contacts the touch panel 100 as the knob 210 is pressed. In addition, the springs 241 and 242 extend when the knob 210 is released, and the second conductor 222 separates from the touch panel 100.

The first conductor 221 is in contact with the touch panel 100 regardless of whether the knob 210 is pressed or not, and corresponds to an object for detecting the rotation information of the input device 200 just like the conductor 220 described above. The second conductor 222 contacts the touch panel 100 when the knob 210 is pressed, and corresponds to an object for detecting the pressing of the input device 200.

According to the third configuration example, not only the rotation information of the input device 200 but also the pressing information of the input device 200 can be detected.

Figure 20:
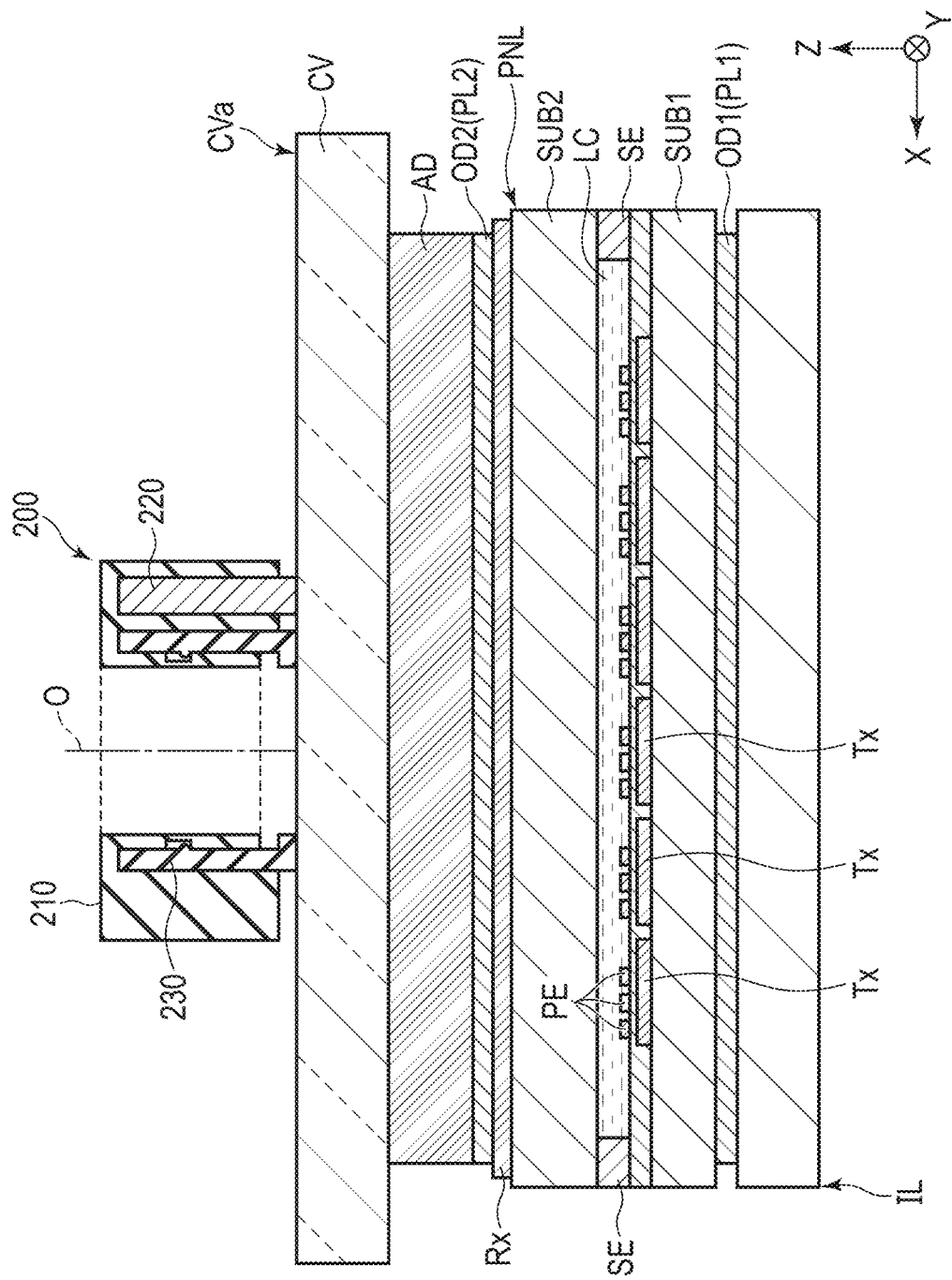
FIG. 20 is a cross-sectional view showing a configuration example of a display device DSP equipped with the sensor device 1.

FIG. 20 is a cross-sectional view showing a configuration example of a display device DSP equipped with the sensor device 1.

The display device DSP comprises a display panel PNL and an illumination device IL. In one example, the display panel PNL is, for example, a liquid crystal display panel, and comprises a first substrate SUB1, a second substrate SUB2 and a liquid crystal layer LC. The first substrate SUB1 and the second substrate SUB2 are bonded together by a sealant SE. The liquid crystal layer LC is held between the first substrate SUB1 and the second substrate SUB2. It should be noted that the display panel PNL may be a display panel comprising an organic electroluminescent element, an electrophoretic element or the like as a display element.

The display panel PNL incorporates the touch panel 100 of the sensor device 1. That is, the first substrate SUB1 comprises the drive electrode Tx of the touch panel 100, and a pixel electrode PE. One drive electrode Tx is opposed to a plurality of pixel electrodes PE. The second substrate SUB2 comprises the detection electrode Rx of the touch panel 100. The drive electrode Tx and the detection electrode Rx are disposed intersecting each other in an XY-plane defined by a first direction X and a second direction Y. In one example, the drive electrodes Tx are arranged at intervals along the first direction X, and the drive electrodes Tx each extend in the second direction Y. In addition, the detection electrodes Rx are arranged at intervals along the second direction Y, and the detection electrodes Rx each extend in the first direction X. Although not described in detail, an insulating substrate and an organic insulating film of the second substrate SUB2, and the liquid crystal layer LC correspond to the dielectric layer De of the touch panel 100.

An optical element OD1 including a polarizer PL1 is located between the first substrate SUB1 and the illumination device IL, and is bonded to the first substrate SUB1. An optical element OD2 including a polarizer PL2 is located between the second substrate SUB2 and the cover member CV, and is bonded to the second substrate SUB2. The cover member CV is bonded to the optical element OD2 by a transparent adhesive AD.

The input device 200 is disposed on the surface CVa of the cover member CV. The conductor 220 is in contact with the surface CVa. The knob 210 is formed in a tubular shape extending along the rotation axis O. Therefore, an image displayed on the display panel PNL can be visually recognized not only in a region outside the input device 200 but also in a region inside surrounded by the knob 210.

The configuration example shown in FIG. 20 corresponds to a configuration example showing a so-called in-cell type in which the touch panel 100 is incorporated in the display panel PNL. However, the touch panel 100 may be an out-cell type or an on-cell type in which the touch panel 100 is disposed overlapping the display panel PNL.

As described above, according to the present embodiment, a sensor device capable of performing highly accurate sensing can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor device comprising:
an electrostatic capacitive touch panel;
a knob disposed rotatably about a rotation axis;
a conductor held by the knob and opposed to the touch panel on a part of a circumference about the rotation axis; and
a sensor controller configured to control the touch panel, wherein
the sensor controller holds a reference signal corresponding to an electrostatic capacitance in a state where the conductor is not opposed to the touch panel,
the sensor controller is configured to receive a first sensor signal from the touch panel in a state where the conductor is opposed to a first position of the touch panel and to detect first coordinates of the conductor based on the first sensor signal and the reference signal in a first sensing period,
the sensor controller is configured to:
receive a second sensor signal from the touch panel in a state where the conductor is opposed to a second position of the touch panel and detect second coordinates of the conductor based on the second sensor signal and the reference signal in a second sensing period,
calculate a movement distance of the conductor based on the first coordinates and the second coordinates, and
detect a rotation angle of the conductor based on the movement distance, and
when the conductor is rotated at a minimum rotation angle θ min to be detected and a reference direct distance between two points between which the conductor is moved is La, if the calculated movement distance is greater than or equal to (La/2) but less than (3*La/2), the sensor controller is configured to detect that the rotation angle is θ min.

2. The sensor device of claim 1, wherein the sensor controller is configured to detect the first coordinates based on a difference value between the first sensor signal and the reference signal.

3. The sensor device of claim 1, wherein
the sensor controller is configured to:
calculate an average value of a plurality of the first sensor signals received in the first sensing period,
calculate an offset amount based on a difference value between the average value of the first sensor signals and an average value of a plurality of the reference signals,
calculate a corrected sensor signal based on the first sensor signal and the offset amount, and
detect the first coordinates based on a difference value between the corrected sensor signal and the reference signal.

4. The sensor device of claim 1, wherein
the touch panel comprises a plurality of drive electrodes and a plurality of detection electrodes intersecting the drive electrodes, and
the sensor controller is configured to transmit a drive signal to the drive electrodes and receive a plurality of the first sensor signals from the detection electrodes.

5. The sensor device of claim 1, wherein the conductor is formed in a dot shape on the circumference.

6. The sensor device of claim 5, wherein a length along the circumference of the conductor is less than a length along the circumference of a non-effective region in which the conductor is not present.

7. The sensor device of claim 1, wherein the conductor is formed in a C shape extending along the circumference and having a notch on a part of the circumference.

8. The sensor device of claim 7, wherein a length along the circumference of the conductor is greater than a length along the circumference of the notch.

9. The sensor device of claim 1, wherein
the conductor comprises a first conductor which is in contact with the touch panel, and a second conductor which is apart from the touch panel, and
the second conductor contacts the touch panel as the knob is pressed.

10. The sensor device of claim 9, wherein
one conductor of the first conductor and the second conductor is formed in a C shape extending along the circumference and having a notch on a part of the circumference, and
another conductor of the first conductor and the second conductor is located in the notch.

11. A sensor device comprising:
an electrostatic capacitive touch panel;
a knob disposed rotatably about a rotation axis;
a conductor held by the knob and opposed to the touch panel on a part of a circumference about the rotation axis; and
a sensor controller configured to control the touch panel, wherein
the sensor controller is configured to:
receive a first sensor signal from the touch panel in a state where the conductor is opposed to a first position of the touch panel and generate a baseline based on the first sensor signal in a first sensing period,
receive a second sensor signal from the touch panel in a state where the conductor is opposed to a second position of the touch panel and generate raw data based on the second sensor signal in a second sensing period,
calculate delta corresponding to a difference value between the baseline and the raw data,
calculate a signal ratio based on a first integral value of a negative signal in the delta and a second integral value of a positive signal in the delta, and
detect a rotation angle of the conductor based on the signal ratio.

12. The sensor device of claim 11, wherein
the sensor controller holds a maximum value Smax of a sum of a third integral value of a negative signal and a fourth integral value of a positive signal,
the sensor controller is configured to:
calculate, after calculating the delta, a signal sum S of the first integral value and the second integral value in the calculated delta, and
calculate the signal ratio defined by (S/Smax).

13. The sensor device of claim 11, wherein
the touch panel comprises a plurality of drive electrodes and a plurality of detection electrodes intersecting the drive electrodes, and
the sensor controller is configured to transmit a drive signal to the drive electrodes and receive a plurality of the first sensor signals from the detection electrodes.

14. The sensor device of claim 11, wherein the conductor is formed in a dot shape on the circumference.

15. The sensor device of claim 14, wherein a length along the circumference of the conductor is less than a length along the circumference of a non-effective region in which the conductor is not present.

16. The sensor device of claim 11, wherein the conductor is formed in a C shape extending along the circumference and having a notch on a part of the circumference.

17. The sensor device of claim 16, wherein a length along the circumference of the conductor is greater than a length along the circumference of the notch.

18. The sensor device of claim 11, wherein
the conductor comprises a first conductor which is in contact with the touch panel, and a second conductor which is apart from the touch panel, and
the second conductor contacts the touch panel as the knob is pressed.

19. The sensor device of claim 18, wherein
one conductor of the first conductor and the second conductor is formed in a C shape extending along the circumference and having a notch on a part of the circumference, and
another conductor of the first conductor and the second conductor is located in the notch.

* * * * *